(12) United States Patent
Moriyasu et al.

(10) Patent No.: US 9,809,709 B2
(45) Date of Patent: Nov. 7, 2017

(54) RECYCLED HOT ASPHALT MIXTURE PRODUCTION METHOD

(71) Applicant: MAEDA ROAD CONSTRUCTION CO., LTD, Tokyo (JP)

(72) Inventors: Hirochika Moriyasu, Tokyo (JP); Kentaro Koshi, Tokyo (JP); Toshihumi Emukai, Tokyo (JP)

(73) Assignee: Maeda Road Construction Co., Ltd., Tokyo (JP)

( * ) Notice: Subject to any disclaimer, the term of this patent is extended or adjusted under 35 U.S.C. 154(b) by 0 days.

(21) Appl. No.: 14/896,205

(22) PCT Filed: May 30, 2014

(86) PCT No.: PCT/JP2014/064446
§ 371 (c)(1),
(2) Date: Dec. 4, 2015

(87) PCT Pub. No.: WO2014/196470
PCT Pub. Date: Dec. 11, 2014

(65) Prior Publication Data
US 2016/0130442 A1 May 12, 2016

(30) Foreign Application Priority Data

Jun. 6, 2013 (JP) .................... 2013-119913

(51) Int. Cl.
*C08L 95/00* (2006.01)
*C08L 91/00* (2006.01)
(Continued)

(52) U.S. Cl.
CPC .............. *C08L 95/00* (2013.01); *C08J 3/005* (2013.01); *C08J 3/20* (2013.01); *C08L 91/00* (2013.01);
(Continued)

(58) Field of Classification Search
CPC ....... C08L 95/00; C08L 91/00; C09D 195/00; C10C 3/00; C04B 26/26; C08J 3/005;
(Continued)

(56) References Cited

U.S. PATENT DOCUMENTS

2009/0304915 A1* 12/2009 Reinke .................... C08L 95/00
427/139
2010/0055304 A1* 3/2010 Reinke .................... C04B 26/26
427/138

(Continued)

FOREIGN PATENT DOCUMENTS

CA 2846931 A1 4/2013
JP 61-243860 A 10/1986
(Continued)

OTHER PUBLICATIONS

Yoshitaka Hachiya et al., "Fundamental Properties of Recycled Asphalt Mixtures", Technical note of Port and Harbour Technical Research Institute, Ministry of Transportation, Japan, 1996, (836), pp. 1 to 15, including English synopsis on p. 4.
(Continued)

*Primary Examiner* — Jennifer A Smith
*Assistant Examiner* — Alexander M Moore
(74) *Attorney, Agent, or Firm* — Muncy, Geissler, Olds & Lowe, P.C.

(57) ABSTRACT

Provided is a production method of a recycled hot asphalt mixture obtained by mixing a recycled aggregate, a new aggregate, asphalt, and an additive for recycle, comprising: heating the additive for recycle; adding moisture to the heated additive for recycle and mixing thereof so as to make the additive for recycle be formed; and adding the additive for recycle in a foamed state to the recycled aggregate, the new aggregate, and the asphalt and mixing thereof.

2 Claims, 5 Drawing Sheets

(51) Int. Cl.
*C08J 3/00* (2006.01)
*C08J 3/20* (2006.01)

(52) U.S. Cl.
CPC ........ *C08J 2395/00* (2013.01); *C08J 2491/00* (2013.01); *C08L 2555/34* (2013.01); *C08L 2555/52* (2013.01)

(58) Field of Classification Search
CPC ...... C08J 3/20; C08J 2395/00; C08J 2491/00; C08J 2555/34; C08J 2555/52
See application file for complete search history.

(56) References Cited

U.S. PATENT DOCUMENTS

| 2011/0146539 | A1* | 6/2011 | Poncelet | ............... | C08L 95/00 106/661 |
| 2013/0276668 | A1* | 10/2013 | Ranka | ................. | C08L 95/005 106/122 |

FOREIGN PATENT DOCUMENTS

| JP | 10-273598 A | 10/1998 |
| JP | 2006-233130 A | 9/2006 |
| KR | 101195856 B1 | 10/2012 |

OTHER PUBLICATIONS

CFA Koho, 2009, pp. 1 to 29.
KJ Jenkins et al.; "Characterisation of Foamed Bitumen"; 7$^{th}$ Conference on Asphalt Pavements for Southern Africa; 18 pgs.
F. Olard et al.; Low Emission & Low Energy Asphalts for Sustainable Road Construction: The European Experience of LEA Process; 10 pgs.
Kim Jonathan Jenkins et al.; Mix Design Considerations for Cold and Half-Warm Bitumious Mixes With Emphasis on Foamed Bitumen; XP008125845; Sep. 2000; 127 pgs.
Best Practice Guideline for Warm Mix Asphalt, Manual 32; Warm Mix Asphalt RSA; Sep. 2011; 127 pgs.
M.M.J. Jacobs, et al.; Successful Dutch Experiences With Low Energy Asphalt Concrete; Department of Technology and Development (T&O), Utrecht, The Netherlands; 10 pgs.
F. Olards, et al.; Laboratory Performance-Based Assessment of Half-Warm Mix Asphalts With High Recycling Rate by Means of the Factorial Experiment Design Approach; Advanced Testing and Characterization of Bitumious Materials; 2009; ISBN 978-0-415-55854-9; 10 pgs.
Pengcheng Fu, et al.; Investigation of the Curing Mechanism of Foamed Asphalt Mixes Based on Micromechanics Principles; Journal of Materials in Civil Engineering; Jan. 2010; 12 pgs.
European Search report dated Jan. 25, 2017 from corresponding Application No. EP 14 80 7444; 15 pgs.
Canadian Office Action for corresponding Canadian Application No. 2,914,206 dated Oct. 19, 2016, 3 pages.

* cited by examiner

RECYCLED HOT ASPHALT MIXTURE PRODUCTION METHOD

TECHNICAL FIELD

The present invention relates to a recycled hot asphalt mixture production method.

BACKGROUND ART

For the pavement of roadways, walkways, or parking lots, asphalt pavement is used in many cases due to the benefit of easy construction. In the case of roadways, about 95% of roadways are paved by asphalt. Recently, in the asphalt pavement construction, maintenance construction is conducted more often compared to new construction, and hence the amount of asphalt excavated materials or asphalt cut materials produced by the maintenance construction increases. Accordingly, the amount of asphalt recycled aggregate produced in a recycled aggregate factory that receives the asphalt excavated materials or the asphalt cut materials also increases.

Since the recycling of massively produced asphalt recycled aggregate is promoted, recently, the ratio of a recycled hot asphalt mixture using the asphalt recycled aggregate becomes about 75% of a total hot asphalt mixture production amount, and the use ratio (recycle ratio) of the asphalt recycled aggregate occupied in the aggregate of the recycled hot asphalt mixture also increases.

As shown in Pavement Recycling Guide (published by Japan Road Association in November in 2010), since in the production of the recycled hot asphalt mixture, asphalt (old asphalt) degraded and hardened due to a common use is included in the asphalt recycled aggregate, an additive for recycle is generally added to the asphalt recycled aggregate in order to recover the property and the state of the old asphalt. When such an additive for recycle is added, a method of adjusting a mixing amount so that obtained recycled asphalt is mixed at a designed mixing ratio or a method of adjusting a mixing amount so that a compression coefficient of a recycled hot asphalt mixture becomes a target value (a design compression coefficient) is employed.

Further, when the recycled hot asphalt mixture is produced in an actual asphalt mixing plant, the additive for recycle is added generally at the timing of mixing an asphalt recycled aggregate, a new aggregate, and new asphalt by a mixer as shown in Asphalt Mixing Plant Guide (published by Japan Road Association in October in 1996). However, due to the recent trend of the recycling promotion, a recycled hot asphalt mixture in which a use ratio (a recycle ratio) of an asphalt recycled aggregate exceeds 50% is produced more than before. Accordingly, there is a need to increase the additive for recycle addition amount. Consequently, the mixing time needs to be longer than before in order to sufficiently mix and disperse the additive for recycle. When the recycle ratio is high, there is a tendency that the production capacity per unit time is degraded. Alternatively, when a method of extending the additive for recycle mixing time is not selected in order to ensure the production capacity even when the additive for recycle addition amount is increased, a variation in property/state of the obtained mixture increases, and hence a problem arises in that workability and compactibility are degraded during construction.

CITATION LIST

Non-Patent Document

Non-Patent Document 1: Pavement Recycling Guide (published by Japan Road Association in November in 2010)

Non-Patent Document 2: Asphalt Mixing Plant Guide (published by Japan Road Association in October in 1996)

DISCLOSURE OF THE INVENTION

Problem to be Solved by the Invention

In view of such circumstances, for example, a method of improving a mixing property of additive for recycle is considered so as not to degrade the mixing efficiency in production and the workability and the compactibility in construction even when the additive for recycle addition amount is increased when the highly recycled hot asphalt mixture (the recycled hot asphalt mixture having a comparatively high asphalt recycled aggregate ratio) is produced.

Means for Solving Problem

On the contrary, the inventors carried out a careful examination in order to solve the above-described problems and contrived the invention by finding out a method of improving the mixing property of additive for recycle by heating the additive for recycle, adding and mixing moisture to and with the heated additive for recycle so as to make the additive for recycle be foamed, and using the additive for recycle in a foamed state as fine bubbles when obtaining the recycled hot asphalt mixture by mixing a recycled aggregate, a new aggregate, asphalt, and the additive for recycle.

That is, according to the invention, provided is a production method of a recycled hot asphalt mixture obtained by mixing a recycled aggregate, a new aggregate, asphalt, and an additive for recycle, comprising:

heating the additive for recycle;

adding moisture to the heated additive for recycle and mixing thereof so as to make the additive for recycle be formed; and adding the additive for recycle in a foamed state to the recycled aggregate, the new aggregate, and the asphalt and mixing thereof.

In the invention, wherein when making the additive for recycle be foamed, a heating temperature T (a unit of ° C.) of the additive for recycle and an addition amount W (an addition amount with respect to the additive for recycle of 100 wt %, a unit of wt %) of the moisture added to the heated additive for recycle satisfy the following relations (1) to (3).

$$105 \le T \le 240 \tag{1}$$

$$0.5 \le W \le 10 \tag{2}$$

$$W < 0.06 \times T - 2.4 \tag{3}$$

Furthermore, the recycled hot asphalt mixture according to the production method of the invention also includes a recycled hot asphalt stabilization bottoming material used for a bottoming purpose other than a mixture used for the surface and base layers of the asphalt pavement.

Effect of the Invention

According to the invention, since the additive for recycle is heated, moisture is added to and mixed with the heated additive for recycle so as to foam the additive for recycle, and the additive for recycle is used in a state of foamed, it is possible to improve the mixing property of additive for recycle. Accordingly, even when the additive for recycle addition amount is increased, the mixing efficiency in production and the workability and the compactibility in construction are satisfactory.

DESCRIPTION OF EMBODIMENTS

A production method of a recycled hot asphalt mixture of the invention is a production method of a recycled hot asphalt mixture obtained by mixing a recycled aggregate, a new aggregate, asphalt, and an additive for recycle, comprising heating the additive for recycle;

adding moisture to the heated additive for recycle and mixing thereof so as to make the additive for recycle be formed; and adding the additive for recycle in a foamed state to the recycled aggregate, the new aggregate, and the asphalt and mixing thereof The additive for recycle used in the invention is not particularly limited as long as a softening action is guaranteed. Specifically, a compound capable of softening degraded asphalt adhering to a recycled aggregate may be employed. Further, an additive for recycle generally used for recovering the property and the state of the recycled aggregate (for example, penetrability of degraded asphalt adhering to the recycled aggregate) can be exemplified. As the additive for recycle, for example, an additive for recycle can be used in which a kinetic viscosity (60° C.) is 80 to 1000 mm²/s and preferably 80 to 300 mm²/s, a flash point is 250° C. or more and preferably 260° C. or more, a specific viscosity (60° C.) obtained after heating a film is 2 or less and preferably 1.5 or less, and a mass change rate obtained when heating a film is within ±3% and preferably ±1.5% (Pavement Recycling Guide 2010 (published by Japan Road Association)).

Further, when the additive for recycle is used in the invention, the additive for recycle is heated and moisture is added to and mixed with the heated additive for recycle so as to cause micro foaming. However, it is preferable to use the additive for recycle in which a FI value of the micro foaming (fine bubbles caused by foaming) is preferably 100 or more, more preferably 125 or more, further preferably 150 or more, and particularly preferably 200 or more. The FI value can be calculated by the equation of KJ Jenkins shown in the following equation (A) from the measurement of the expansion ratio: $ER_m$, the foaming half-value period: $\tau_{1/2}$, the expansion ratio correction coefficient: c, and the spray time: $t_s$ at the time point in which the additive for recycle has a maximum volume when the additive for recycle is heated to 150° C. and is foamed by using water of 2 wt % at a normal temperature (25° C.) with respect to the additive for recycle of 100 wt %, and the additive for recycle is sprayed into a predetermined container (CHARACTERISATION OF FOAMED BITUMEN: 7TH CONFERENCE ON ASPHALT PAVEMENTS FOR SOUTHERN AFRICA: 1999). Fine bubbles are obtained as the FI value increases, which is preferable. Furthermore, the expansion ratio $ER_m$ is the ratio of the volume of the foam body having a maximum volume with respect to the total volume of the additive for recycle and the water in a non-foamed state, and the foaming half-value period $\tau_{1/2}$ is a time taken until the volume of the foam body becomes a half from the foamed state. Further, the expansion ratio correction coefficient c is a coefficient obtained in accordance with (ERm/ERa). (ERm: measured maximum expansion ratio and ERa: actual maximum expansion ratio)

$$FI = \frac{-\tau_{1/2}}{\ln 2}\left(4 - ER_m - 4\ln\left(\frac{4}{ER_m}\right)\right) + \left(\frac{1+c}{2c}\right) * ER_m * t_s \quad (A)$$

For example, if the life time (the half-value period $\tau_{1/2}$) of the obtained fine bubble is short even when the expansion ratio $ER_m$ is high, in many cases, the mixing efficiency in production cannot be improved sufficiently. For this reason, it is preferable to use the additive for recycle in which the FI value obtained by adding the foaming half-value period $\tau_{1/2}$ together with the expansion ratio $ER_m$ falls within the above-described range.

As such an additive for recycle, an asphalt-based additive for recycle, a petroleum-based additive for recycle, a mineral-based additive for recycle, animal/plant oil-based additive for recycle, or an asphalt emulsion-based additive for recycle may be exemplified. As such an additive for recycle, commercial products such as "NRC-120" produced by Nissin Kasei Co., Ltd., "B Cut" and "B Emulsion" produced by Toa Road Corporation, "Refine P" and "Refine E" produced by Nichireki Co., Ltd., "SNH540" produced by Sankyo Yuka Co., Ltd., "NT900" produced by JX Nippon Oil & Energy Corporation, "T-revive" produced by Taniguchi Petroleum Refining Co., Ltd., "Fujitac #200" produced by Fuji Kosan Co., Ltd., and "SR Lax" produced by Shinreki Industry Co., Ltd. can be used. The additive for recycles can be used alone or can be used in combination of two or more additive for recycles.

The mixing ratio of the additive for recycle is not particularly limited. However, the mixing ratio may be determined in response to the type of the additive for recycle in use or the mixing amount of the recycled aggregate. Here, as will be described later, in the invention, the additive for recycle is added while being foamed as fine bubbles. For this reason, even when the additive for recycle mixing amount is comparatively decreased, the dispersing (mixing) property is high, and the action of softening degraded asphalt adhering to the recycled aggregate is high. For this reason, since the compression coefficient can be decreased, the mixing amount is smaller than that of the prior art. Furthermore, generally the additive for recycle mixing amount is preferably 0.02 to 1.6 parts per weight with respect to the recycled aggregate 100 parts per weight.

As the recycled aggregate, a classified recycled aggregate having degraded asphalt adhering thereto and obtained by dismantling the pavement can be used. Further, as a new aggregate, an aggregate such as crushed stone, sand, and stone dust used for general pavement asphalt can be appropriately used. The combination ratio between the recycled aggregate and the new aggregate is not particularly limited, and may be appropriately determined in response to the type of the aggregate in use.

As the asphalt used in the invention, straight asphalts 40 to 60, 60 to 80, 80 to 100, 100 to 120, 120 to 150, 150 to 200, and 200 to 300 can be exemplified. These examples can be used alone or in combination of two or more examples. The mixing amount of asphalt is not particularly limited, but may be determined in response to the type and the mixing amount of the new aggregate in use.

In the production method of the invention, the additive for recycle which is foamed as fine bubbles is added to the mixture of the recycled aggregate, the new aggregate, and the asphalt and theses are mixed with one another, thereby producing a recycled hot asphalt mixture. According to the production method of the invention, since the additive for recycle is added in a foamed state, the dispersing (mixing) property is improved and the action of softening degraded asphalt adhering to the recycled aggregate is improved. For this reason, the compression coefficient can be decreased, and hence the additive for recycle addition amount can be decreased. Further, since the additive for recycle mixing property can be improved, the mixing time during the production of the recycled hot asphalt mixture can be shortened, and hence the mixing efficiency in production can be improved. Further, a bearing effect is exhibited by fine bubbles included in the additive for recycle, and hence the high flowability of the obtained recycled hot asphalt mixture can be ensured. For this reason, the workability and the compactibility in construction can be improved.

In the invention, as a method of foaming the additive for recycle, a method is employed which heats the additive for recycle, adds and mixes moisture to and with the heated additive for recycle, and causes micro foaming in the additive for recycle by using the vaporization/expansion of water. Furthermore, in the invention, it is preferable that the addition amount W (the addition amount with respect to the additive for recycle of 100 wt %, a unit of wt %) of moisture added to the heated additive for recycle and the heating temperature T (unit of ° C.) of the additive for recycle when foaming the additive for recycle satisfy the following relations (1) to (3). By satisfying the following relations (1) to (3), the additive for recycle can be more appropriately foamed.

$$105 \leq T \leq 240 \quad (1)$$

$$0.5 \leq W \leq 10 \quad (2)$$

$$W < 0.06 \times T - 2.4 \quad (3)$$

Furthermore, it is preferable that the heating temperature T (unit of ° C.) of the additive for recycle when foaming the additive for recycle be in the range of $105 \leq T \leq 240$, but since the mixing property of additive for recycle can be improved by increasing expansion ratio of additive for recycle, it is more preferable that the heating temperature T be in the range of $110 \leq T \leq 200$. Similarly, it is preferable that the addition amount W (the addition amount with respect to the additive for recycle of 100 wt %, a unit of wt %) of moisture added to the heated additive for recycle when foaming the additive for recycle be in the range of $0.5 \leq W \leq 10$, but since the mixing property of additive for recycle can be improved by increasing expansion ratio of additive for recycle, it is more preferable that the moisture addition amount W be in the range of $1.0 \leq W \leq 3.0$.

Further, the bubble diameter of the micro foaming generated in the additive for recycle when foaming the additive for recycle is not particularly limited. However, a micro-order size is preferable, 10 μm or less is more preferable, and 5 μm or less is further preferable. When the bubble size is too large, there is a case in which a bearing effect is not exhibited and a flowability effect cannot be obtained. Further, the expansion ratio (the volume increase ratio of the additive for recycle with respect to the volume in the non-micro foamed state) of the additive for recycle is preferably 5 to 50 times and more preferably 10 to 30 times.

Then, in this way, the foamed additive for recycle, which is foamed by adding and mixed moisture in a heated state, is added to and mixed with the mixture of the recycled aggregate, the new aggregate, and the asphalt so as to obtain the recycled hot asphalt mixture.

Furthermore, in the production method of the invention, the foaming method of additive for recycle is not particularly limited. However, for example, a method may be employed in which a supply pipe for supplying the additive for recycle is provided with a heating member for heating the additive for recycle and a moisture inlet for introducing moisture and the additive for recycle heating operation and the moisture adding and mixing operation are performed inside the supply pipe so as to foam the additive for recycle inside the supply pipe. Then, when the additive for recycle foamed in this way is sprayed from a plurality of spray ports provided in the supply pipe into a mixer including the mixture of the recycled aggregate, the new aggregate, and the asphalt so as to mix the mixture, a recycled hot asphalt mixture can be obtained.

EXAMPLES

Hereinafter, the invention will be described based on more detailed examples, but the invention is not limited to the examples.

Example 1 (Evaluation of Expansion Ratio)

A mineral oil-based additive for recycle (which has a product name: "T-revive" produced by Taniguchi Petroleum Refining Co., Ltd., a kinetic viscosity (60° C.): 82 mm$^2$/s, a flash point: 264° C., a specific viscosity (60° C.) obtained after heating a film: 1.05, a mass change rate obtained when heating a film: −0.42%, and a FI value obtained according to the above-described method: 200 or more) as an additive for recycle was heated in the range of 100 to 240° C. and moisture of 0.5 to 12 wt % was added with respect to the heated mineral oil-based additive for recycle of 100 wt % so as to foam the mineral oil-based additive for recycle. Then, the ratio of the maximum volume of the foamed mineral oil-based additive for recycle with respect to the volume of the non-foamed mineral oil-based additive for recycle was calculated so as to obtain a mineral oil-based additive for recycle expansion ratio. The result is shown in Table 1.

[Table 1]

TABLE 1

| Additive for recycle | Water addition amount (wt %) | | | | | | | |
|---|---|---|---|---|---|---|---|---|
| temperature (° C.) | 0.5 | 1.0 | 2.0 | 3.0 | 5.0 | 7.0 | 10.0 | 12.0 |
| 100 | D | D | D | D | D | D | D | D |
| 105 | B | B | B | C | D | D | D | D |
| 125 | B | A | A | A | C | D | D | D |
| 150 | B | A | A | A | B | D | D | D |
| 175 | B | A | A | A | B | C | D | D |

TABLE 1-continued

| Additive for recycle temperature (° C.) | Water addition amount (wt %) | | | | | | | |
|---|---|---|---|---|---|---|---|---|
| | 0.5 | 1.0 | 2.0 | 3.0 | 5.0 | 7.0 | 10.0 | 12.0 |
| 200 | C | B | A | A | B | C | C | D |
| 240 | C | B | B | B | B | C | C | D |

A: Expansion ratio equal to or larger than 10 times
B: Expansion ratio equal to or larger than 5 times and smaller than 10 times
C: Expansion ratio smaller than 5 times
D: No foaming From Table 1, it is proved that the mineral oil-based additive for recycle can be foamed satisfactorily when the mineral oil-based additive for recycle temperature T (a unit of ° C.) and the moisture addition amount W (the addition amount with respect to the additive for recycle of 100 wt %, a unit of wt %) fall within the range of satisfying the relations (1) to (3).

Figure 1:
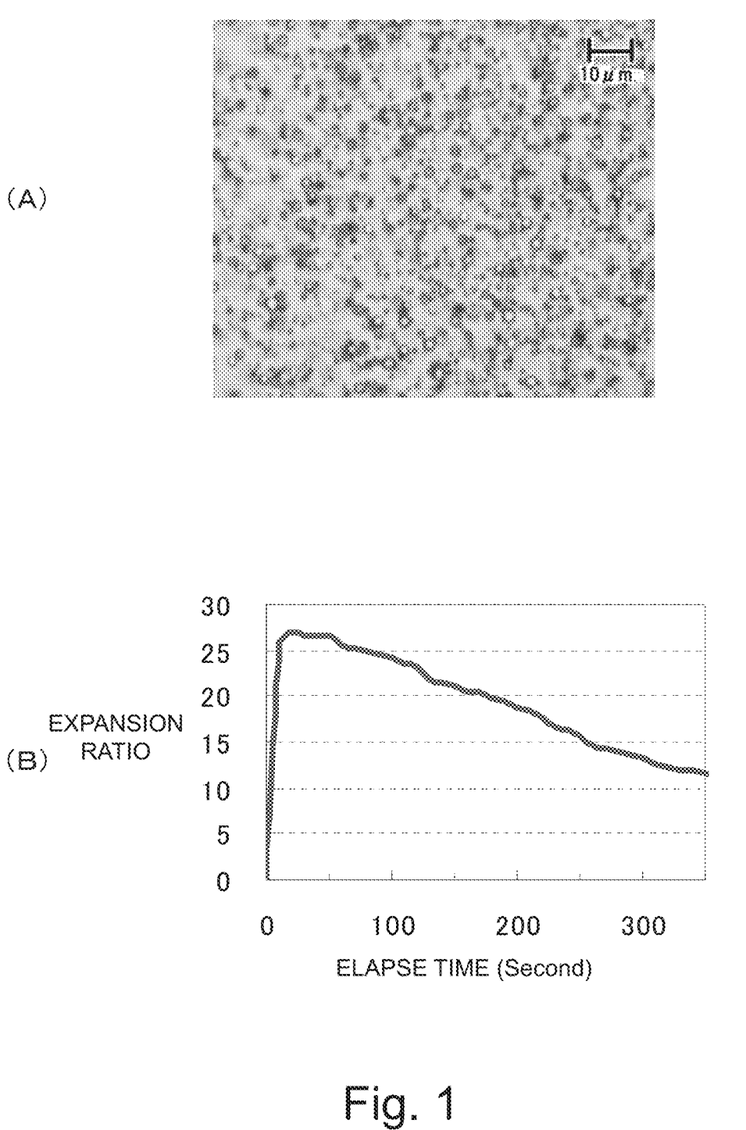
FIG. 1(A) is an optical microscope photograph of a sample in which heating temperature of a mineral oil-based additive for recycle is 150° C. and a moisture addition amount is 3.0 wt %
FIG. 1(B) is a graph illustrating a change in expansion ratio of the sample with time.

Furthermore, FIG. 1(A) is an optical microscope photograph of a sample in which heating temperature of a mineral oil-based additive for recycle is 150° C. and the moisture addition amount is 3.0 wt % and FIG. 1(B) is a graph illustrating a change in expansion ratio with time. From FIG. 1(A), according to the production method of the invention, it is found that micro foaming having a micro-order size can be formed in the mineral oil-based additive for recycle and the formed micro foaming is maintained excellently (the formed micro foaming is maintained for a long time).

Example 2 (Production of Recycled Hot Asphalt Mixture)

A classified asphalt recycled aggregate (13-0): 68.8 parts per weight, a new aggregate: 28.2 parts per weight, and new straight asphalt 60 to 80: 2.7 parts per weight were mixed in a mixer so as to obtain an aggregate asphalt mixture.

Then, a mineral oil-based additive for recycle (Product Name: "T-revive" produced by Taniguchi Petroleum Refining Co., Ltd.) of 0.3 parts per weight as an additive for recycle was heated at 130° C., and water of 2.0 parts per weight was added thereto so as to foam the mineral oil-based additive for recycle. Then, the foamed mineral oil-based additive for recycle was sprayed to and mixed with the prepared aggregate asphalt mixture so as to obtain a recycled hot asphalt mixture.

Comparative Example 1 (Production of Recycled Hot Asphalt Mixture)

By a method similar to Example 1 except that the micro foaming of the additive for recycle was not performed, the additive for recycle was sprayed to and mixed with the aggregate asphalt mixture so as to obtain a recycled hot asphalt mixture.

Test and Evaluation in Example 2 and Comparative Example 1

Then, the workability and the compression test of the recycled hot asphalt mixtures obtained in Example 2 and Comparative Example 1 were performed according to the following method for the evaluation thereof.

[Workability Test]

Figure 2:
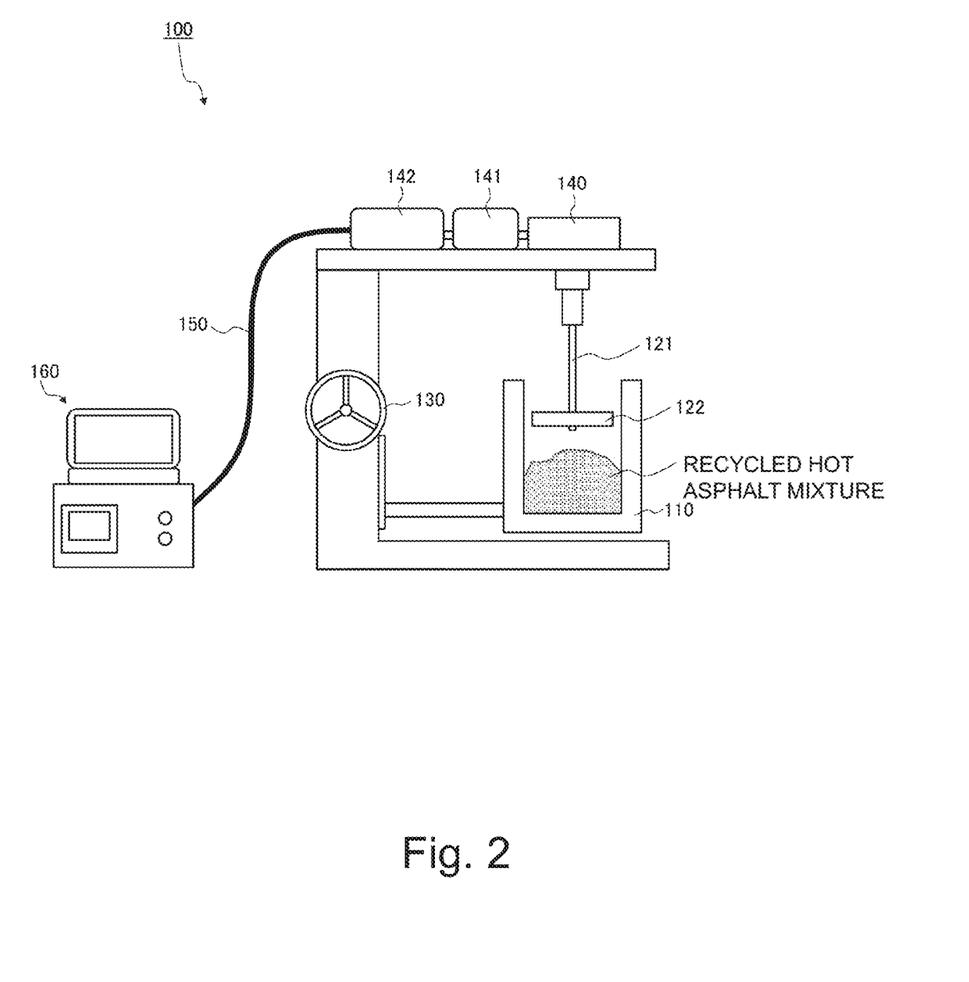
FIG. 2 is a view illustrating a workability evaluation test machine used in the example.

The workability of the recycled hot asphalt mixture was evaluated by a workability evaluation test machine 100 illustrated in FIG. 2. The workability evaluation test machine 100 illustrated in FIG. 2 includes a cylindrical container 110 which places a recycled hot asphalt mixture thereon and an elevation handle 130 which moves the cylindrical container 110 in the up and down direction. Further, the workability evaluation test machine 100 includes a rotation blade 122 held by a shaft 121, and a rotational driving force generated from a drive source 140 is transmitted to the rotation blade 122 through a gear box 141 and the shaft 121 so that the rotation blade 122 is rotated. Further, the workability evaluation test machine 100 includes a digital torque meter 142 which measures a rotation torque of the drive source 140, and the rotation torque of the drive source 140 measured by the digital torque meter 142 is transmitted to a data logger 160 via a communication line 150.

Figure 3:
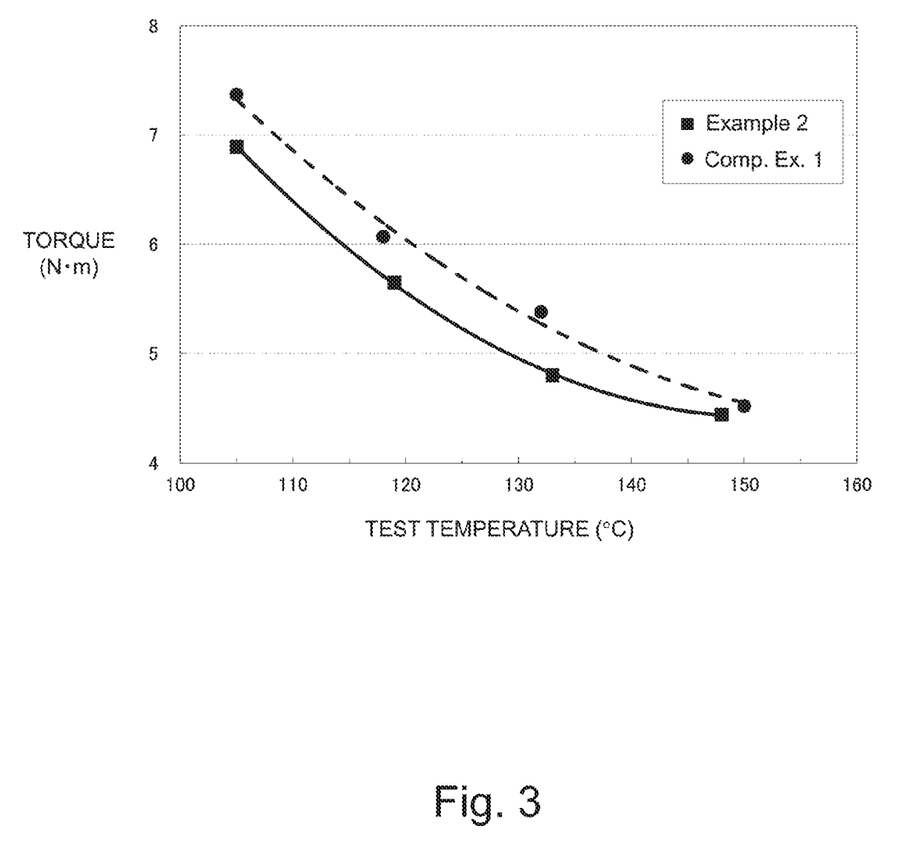
FIG. 3 is a graph illustrating a workability evaluation result in Example 2 and Comparative Example 1.

Then, in the example, the cylindrical container 110 was moved upward by the elevation handle 130 until the rotation blade 122 was completely buried into the recycled hot asphalt mixture placed inside the cylindrical container 110. In this state, the rotation torque necessary for rotating the rotation blade 122 was measured so as to evaluate the workability. Furthermore, the evaluation of the workability was performed at about 100° C., about 120° C., about 130° C., and about 150° C. Since the rotation blade can be handled by a small force as the rotation torque decreases, it is determined that the workability is excellent. The result of Example 2 and Comparative Example 1 is illustrated in FIG. 3.

[Compression Test]

Figure 4:
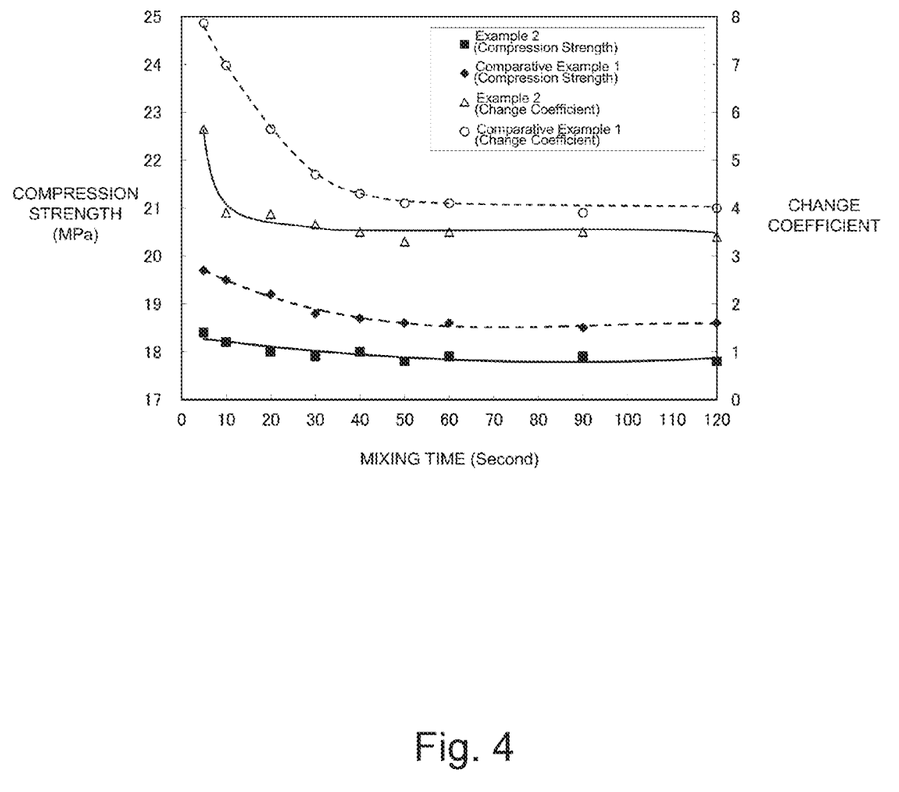
FIG. 4 is a graph illustrating an evaluation result of a compression test in Example 2 and Comparative Example 1.

The recycled hot asphalt mixtures obtained in Examples and Comparative Examples were cured at 145° C., and a compression test was performed on the mixtures at a sample temperature of 20° C. according to "B006 Compression Test in Pavement Examination and Test Guide". Furthermore, in the compression test, there is a tendency that the obtained pavement is hardened as the obtained compression strength increases and the obtained pavement is softened as the compression strength decreases. The recycled asphalt is degraded as the number of times of recycling increases, and hence the obtained pavement is hardened. Due to such a tendency, it is desirable to decrease the compression coefficient in order to prevent an increase in hardness of the pavement with an increase in the number of times of recycling. The obtained result is illustrated in FIG. 4. Furthermore, in the test, a plurality of samples having different mixing time values is prepared, and the compression strength of the plurality of samples at different mixing time values are obtained. Then, the average and the change coefficient of the obtained compression strength are illustrated in FIG. 4.

[Evaluation]

From FIG. 3, in Example 2 in which the additive for recycle is foamed and added, the workability is excellent due to the high workability (low torque) even when the additive for recycle addition amount is the same compared to Comparative Example 1 in which the additive for recycle is not foamed. Further, from FIG. 4, in Example 2 in which the additive for recycle is foamed and added, the compression coefficient is small even when the additive for recycle addition amount is the same compared to Comparative Example 1 in which the additive for recycle is not foamed.

Further, the non-uniformity (the change coefficient) of the property and the state of the obtained mixture also decreases, and hence a stable mixture can be produced.

From these results, according to the invention, since the additive for recycle is foamed and added, it is possible to realize excellent workability (mixing efficiency in production and workability in construction) at the same addition amount compared to a case where the additive for recycle is not foamed and hence to realize excellent pavement.

Example 3 and Comparative Example 2

Figure 5:
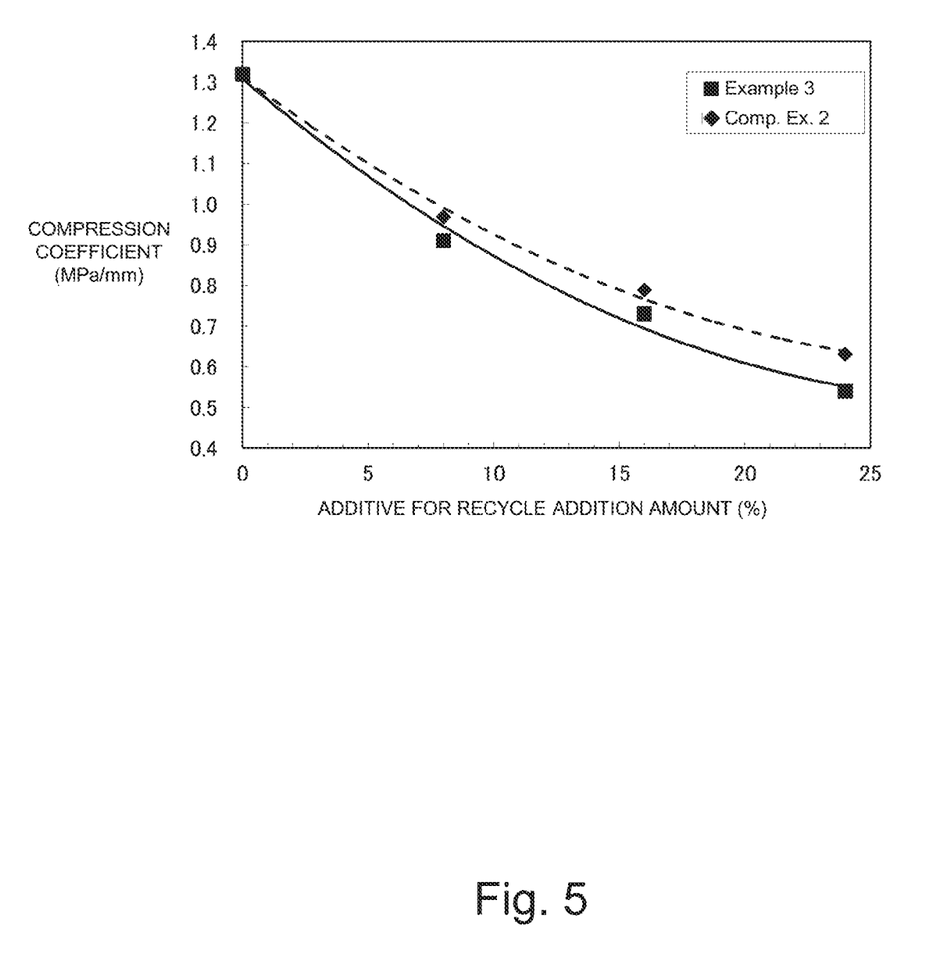
FIG. 5 is a graph illustrating an evaluation result of a compression test in Example 3 and Comparative Example 2.

By a method similar to Example 2 and Comparative Example 1 except that the mixing amount of the mineral oil-based additive for recycle (Product Name: "T-revive" produced by Taniguchi Petroleum Refining Co., Ltd.) was changed, a recycled hot asphalt mixture was obtained and a compression test was performed as described above. FIG. 5 illustrates a graph of the compression coefficient obtained from the result of the compression test. Furthermore, Example 3 corresponds to Example 2, and Comparative Example 2 corresponds to Comparative Example 1. From FIG. 5, even when the additive for recycle mixing amount is changed, in Example 3 in which the additive for recycle is foamed and added, the compression coefficient is small at the same additive for recycle addition amount compared to Comparative Example 2 in which the additive for recycle is not foamed.

EXPLANATIONS OF LETTERS OR NUMERALS

100 workability evaluation test machine
110 cylindrical container
122 rotation blade
140 drive source
142 digital torque meter

The invention claimed is:

1. A production method of a recycled hot asphalt mixture obtained by mixing a recycled aggregate, a new aggregate, asphalt, and an additive for recycle, comprising:
heating the additive for recycle;
adding water to the heated additive for recycle and mixing thereof so as to make the additive for recycle pre-foamed without presence of the asphalt and to make the additive for recycle a foamed state before mixing the additive for recycle into asphalt; and
adding the additive for recycle in the foamed state to the recycled aggregate, the new aggregate, and the asphalt and mixing thereof,
wherein the additive for recycle is at least one selected from a group consisting of an asphalt-based additive for recycle, a petroleum-based additive for recycle, a mineral-based additive for recycle, animal/plant oil-based additive for recycle, and an asphalt emulsion-based additive for recycle, and
when making the additive for recycle the foamed state, a heating temperature T (a unit of ° C.) of the additive for recycle and an addition amount W (an addition amount with respect to the additive for recycle of 100 wt %, a unit of wt %) of the water added to the heated additive for recycle satisfy the following relations (1) to (3)

$$105 \leq T \leq 240 \quad (1)$$

$$0.5 \leq W \leq 10 \quad (2)$$

$$W < 0.06 \times T - 2.4 \quad (3).$$

2. The production method of a recycled hot asphalt mixture according to claim 1,
wherein when making the additive for recycle the foamed state, a volume increase ratio of the additive for recycle with respect to the volume before foaming is preferably 5 to 50 times.

* * * * *